Patented Mar. 16, 1954

2,672,424

UNITED STATES PATENT OFFICE 2,672,424

CEMENT COMPOSITION

Steven B. Avery, East Orange, N. J., assignor of one-half to Lucian J. Clark

No Drawing. Application December 29, 1950, Serial No. 203,543

1 Claim. (Cl. 106—89)

This invention relates to a cement composition. It relates more particularly to a Portland cement mix that, after wetting with water, is quick setting and when set is of reduced pore size, shrinkage on drying and efflorescence as compared to conventional Portland cement.

Briefly stated, my invention comprises an inorganic calcareous cement, of which Portland cement is the preferred variety, and admixed bleaching powder. For most uses the cement composition is made to include also finely divided silica or other filler material. In one embodiment, the invention comprises the incorporation of a polyhydroxy organic acid to control the rate of setting of the Portland cement and bleaching powder composition.

The incorporation of the bleaching powder gives a number of surprising results. First, there is a decrease in the permeability of the set product to liquid water, this in spite of the high solubility of the bleaching powder itself. Another advantage is such high water retention during the setting and hardening of the cement as to make unnecessary the addition of water or prevention of evaporation from exposed surfaces. Another effect is the increase in the proportion of the cement hydrated in setting. There is also the elimination of objectionable efflorescence which commonly occurs on Portland cement castings set with a surface exposed to air. The efflorescence is understood to be due to migration of a soluble substance present or of the calcium hydroxide liberated during the setting of cement. This migration with the water present, to the surface from which the water evaporates, occurs to an extent causing deposition of a film of hydroxide on the said surface, even though the hydroxide is only very slightly soluble in water. The introduction of bleaching powder which, as incorporated, is freely soluble in water not only fails to increase the efflorescence of the cement composition on setting but actually practically eliminates this effect in so far as can be judged by ordinary observation.

These effects are considered to be due to the chemical reaction of the bleaching powder with the Portland cement in such manner as to destroy the original water solubility of the powder and also to prevent the development of the large proportion of calcium hydroxide usually liberated in the setting of conventional Portland cement compositions. I consider the principal cause to be reaction of the calcium hydroxide, as liberated, with the bleaching powder, to form a basic calcium hypochlorite or like salt. Such reaction, removing a product of the setting, should accelerate the setting as well as decrease the solubility of the bleaching powder. An additional cause of some of the desirable effects noted is considered to reside in the high content of water of crystallization in the set product, the proportion of such fixed water being approximately double that in ordinary Portland cement.

Bleaching powder of the approximate formula $CaOCl_2$ is to be distinguished from calcium oxychloride ($CaO.CaCl_2$) which has been previously used in Portland cement compositions. Although containing the same elements, the two chemicals act differently. The calcium oxychloride is less effective in increasing the rate of setting of the cement composiiton. Also, the oxychloride increases the hygroscopicity of the set cement, in spite of the fact that the calcium oxychloride is itself originally less soluble than the bleaching powder. The bleaching powder is a chlorinating or oxidizing agent because of its content of available chlorine.

As the cement to be used, I find no advantage over Portland cement in any of the more expensive inorganic cementing materials. For this reason, I use Portland cement as the cement ingredient of my composition. This Portland cement may be any of the commercial grades of it and of the usual fineness of milling.

I use bleaching powder containing at least about 35% of available chlorine and suitably at least 40% and up to 77% of available chlorine. If the available chlorine content of the bleaching powder used is substantially below 35%, then there is loss in the desired accelerated rate of curing of the cement.

As the filler, I use to advantage a finely divided silica or siliceous material. Examples are fine sand, pulverized sand, silica flour, granite dust, or kaolin. Other fillers that may be used are ground marble or clay. Also there may be used pigmentary fillers, such as ground colored shale, clay, marble, and iron, chromium, and cobalt oxides.

When the so-called filler used does not supply the color desired, then additional pigmentary material may be added as, for instance, whiting, titanium oxide, lithopone, or other inorganic pigment.

To decrease the effect of the bleaching powder on rate of setting of the cement, while preserving other desirable properties of the mix, I incorporate for some uses a retarder of setting. For this purpose I use a polyhydroxy organic acid containing 4 to 12 carbon atoms to the molecule. Examples are tartaric, citric, gluconic, and saccharic acids.

The water used in mixing the Portland cement composition before setting may be any of the kinds normally used in mixing Portland cement.

The proportions of the several materials that have been found to be particularly satisfactory and also ranges which may be used in producing the composition of the invention are shown in the following table, proportions here and elsewhere herein being expressed as parts by weight.

| Kind of ingredient | Proportion | |
| --- | --- | --- |
| | Preferred | Range |
| Portland cement | 100 | 100. |
| Bleaching powder | 4 | 2–10. |
| Filler | 30 | 10–50. |
| Organic acid retarder | 0.1 to 0.5 | 0–1. |
| Pigments | As desired | As desired. |

The preferred proportion of bleaching powder above is stated for one containing 70% to 77% of available chlorine. The proportion of the powder within the range 2–10 parts is generally higher, the lower the percentage of available chlorine in the bleaching powder used. With one containing 40% of available chlorine, for instance, I prefer to use about 7 parts. In general, the proportion of available chlorine used should correspond to approximately 2 to 6 parts for 100 parts of the Portland cement.

The amount of water used in mixing the cement composition of kind shown in the table and described herein is a proportion usual for Portland cement and ordinarily about 50 to 60 parts for 100 parts of the dry cement mix.

In making the cement composition, any order of mixing of the ingredients may be followed.

After mixing with the water, the material should be used promptly although the setting starts almost at once.

The invention will be further illustrated by description in connection with the following specific examples of the practice of it.

*Example 1*

A Portland cement for general use is made by mixing 100 parts of commercial ground Portland cement with 4 parts of bleaching powder containing 70% to 77% of available chlorine and 30 parts of silica flour of size to pass practically completely through a 50-mesh screen.

In use, this composition is mixed with 55% of its weight of water and the wet mix so made is placed in forms of usual type for casting Portland cement. The material hardens to give a product of surface resembling somewhat a porcelain of eggshell gloss finish. It has disinfecting and deodorizing properties.

This composition may also be applied in the form of a thin mix as a point or coating to the surface of masonry construction, as by brush, spray, or roller application.

*Example 2*

100 parts of commercial ground Portland cement are mixed with 7 parts of bleaching powder of 40% available chlorine content and with 250 parts of sand.

The composition so made is useful after mixing with water as a water-tight plastic stucco. It is useful as a non-shrinking mortar for tile setting and like purposes.

*Example 3*

The cement mix of Example 1 is applied as a coating over a wet asbestos and cement siding unit or shingle of conventional type. Even though applied in a coating as thin as 0.004 inch, the coating after setting is relatively white, smooth, continuous, permanently adhering, impermeable to the passage of water, and free from dusting, peeling off or checking.

The application of the coating to the asbestos and cement article is made to advantage by brush, spray, or roller, the composition of Example 1 being first mixed with water in proportion to give the consistency desired for brushing or spraying.

*Example 4*

The procedure of any one of the Examples 1 to 3 is followed except for the admixture of 0.1 to 1 part of tartaric, citric, gluconic, or saccharic acid or a mixture of two or more of them in total amount not exceeding 1 part for 100 parts of actual Portland cement, the said acid being added before the addition of water to the cement.

The addition of the acid reduces to half or less the rate of setting of the mix, the reduction being particularly large when the proportion of acid used is around 0.5 part or more.

My compositions are produced from relatively inexpensive, commercially abundant raw materials. The compositions are stable in dry condition in storage. They do not release the usual large proportion of lime during setting in the aqueous mix. They do not require the incorporation of aluminum, calcium, or zinc stearate or like water repellent agent to give substantial impermeability to liquid water. Because they are free from the hygroscopicity usual in oxychloride cements, they may be packaged in the usual paper cement bags.

It will be understood also that it is intended to cover all changes and modifications of the examples of the invention herein chosen for the purpose of illustration which do not constitute departures from the spirit and scope of the invention.

What I claim is:

A cement composition characterized by high water retention during setting and minimized permeability to water and efflorescence of the said material, the said composition consisting essentially of a dry mixture of Portland cement and bleaching powder in proportion to supply approximately 2–6 parts of available chlorine for 100 parts of the Portland cement.

STEVEN B. AVERY.

References Cited in the file of this patent

UNITED STATES PATENTS

| Number | Name | Date |
| --- | --- | --- |
| 1,792,755 | Olson | Feb. 17, 1931 |
| 2,024,791 | Adolph | Dec. 17, 1935 |
| 2,061,774 | Olson | Nov. 21, 1936 |
| 2,174,051 | Winkler | Sept. 26, 1939 |
| 2,240,191 | McKee | Apr. 29, 1941 |

OTHER REFERENCES

West, P. C. H., "Modern Manufacture of Portland Cement," Crosby Lockwood & Son, London (1910), page 48.

Mellor, J. W., "A Comprehensive Treatise on Inorganic Theoretical Chemistry," Longmans, Green & Co., London (1922), page 259.